Nov. 25, 1952     A. L. BAKER     2,619,002
OPTICAL SCALE READING SYSTEM
Filed June 23, 1949     2 SHEETS—SHEET 1
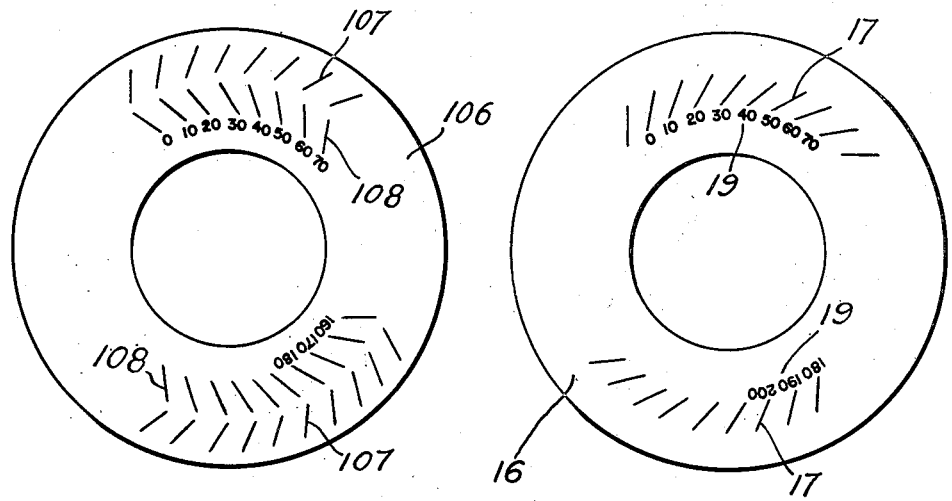
Fig. IV     Fig. III
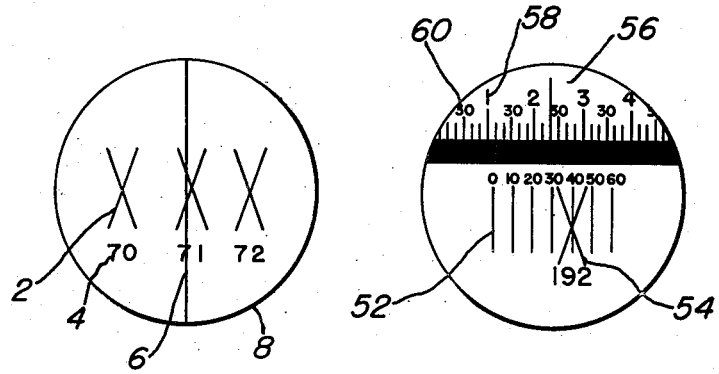
Fig. I     Fig. V
*INVENTOR.*
ALLISTER L. BAKER
BY
ATTORNEY Nov. 25, 1952  A. L. BAKER  2,619,002
OPTICAL SCALE READING SYSTEM
Filed June 23, 1949  2 SHEETS—SHEET 2
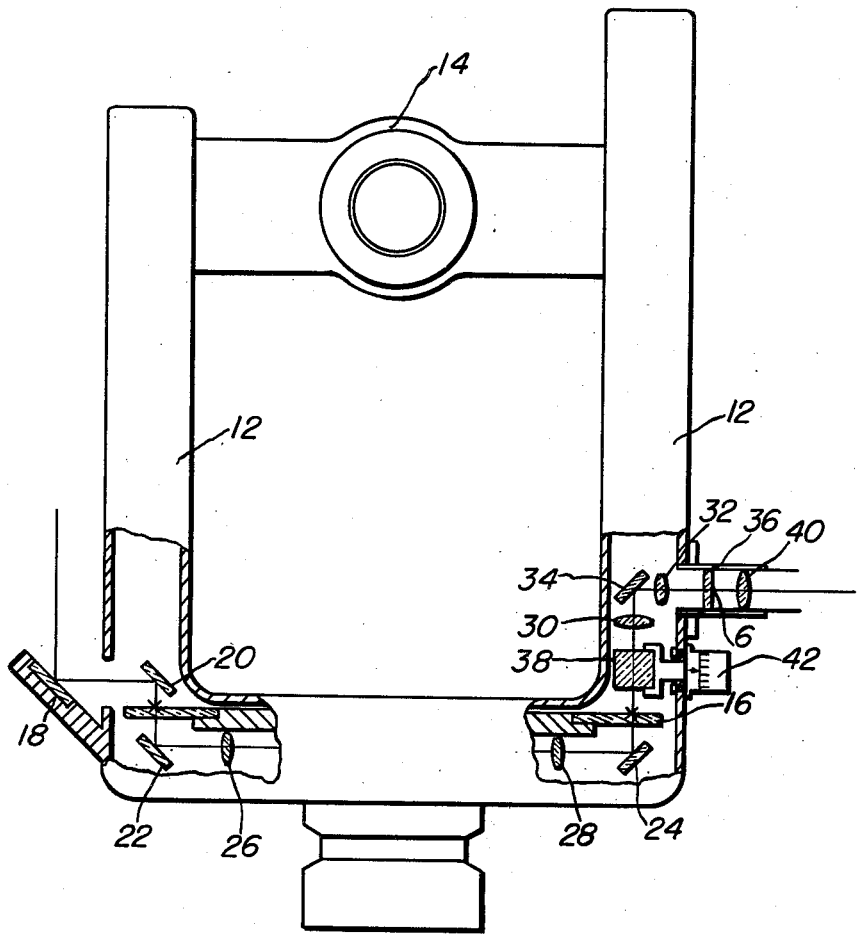
Fig. II
INVENTOR.
ALLISTER L. BAKER
ATTORNEY Patented Nov. 25, 1952

2,619,002

UNITED STATES PATENT OFFICE 2,619,002

OPTICAL SCALE READING SYSTEM

Allister L. Baker, Jersey City, N. J., assignor to Keuffel & Esser Company, Hoboken, N. J., a corporation of New Jersey Application June 23, 1949, Serial No. 100,815

3 Claims. (Cl. 88—1)

This invention relates to a type of optical reading system known in the art as an optical micrometer which depends for its operation upon the setting of an index line on the nearest line of a scale. It is particularly useful in an optical reading system for reading the scales of a theodolite.

It is customary in optical reading systems of this type to use a scale having lines representing divisions drawn perpendicular to the direction of measurement. In the case of a circular scale or protractor the direction of measurement is circumferential and the lines perpendicular to this direction are radial. The present invention utilizes lines representing divisions which are inclined to the perpendicular to the direction of measurement. In a circular scale, the division lines are therefore non radial.

Optical reading theodolites usually are provided with scales having radial lines which may be set between two parallel index lines. In some theodolites, an averaging system is used in which two diametrically opposite lines are imaged as parallel lines and set over an index mark. This averages the readings of the opposite lines and thereby eccentricity errors are eliminated. This latter arrangement has the disadvantage however that if the scale is mounted slightly eccentric to the axis about which it turns the spacing between the parallel imaged lines will vary as the reading system is turned relative to the scale or vice versa. In the present invention this difficulty is overcome by utilizing non-radial scale lines which are imaged together to form an X by the averaging system. The X always has a definite intersection point that may be set on an index line.

The principal object of the invention is to provide an optical micrometer permitting extremely accurate settings by aligning the intersection point of an X with a straight line.

Another object of the invention is to provide an averaging optical reading system for theodolites in which diametrically opposite scale lines are imaged to form an X having a definite intersection point which may be accurately aligned with a straight line index mark.

Another object of the invention is to provide an optical reading system in which a scale line or pair of lines may be matched with any of a plurality of index lines in such a manner that the plurality of index lines act as subdivisions of the scale.

These and other objects of the invention and the means for their attainment will become more apparent from the following description taken in connection with the accompanying drawings in which:

Fig. I is a view as seen through the eyepiece of an optical instrument utilizing the invention showing the nature of the setting to be made.

Fig. II is a view in diagrammatic elevation and partly in section showing a theodolite using the invention.

Fig. III is a view in plan showing one type of scale according to the invention having the normally microscopic scale division enlarged.

Fig. IV is a view in plan showing another type of scale according to the invention having the normally microscopic scale divisions enlarged.

Fig. V is a view as seen through the eyepiece of an optical instrument utilizing another form of the invention, showing the arrangement of scales.

In Fig. I the row of X's 2 provided with numbers 4 are shown imaged in the plane of the index line 6. The circle 8 indicates the extent of the field of view. To use the micrometer the X nearest to the index line 6 would be set thereon and the subdivided reading would be read off a micrometer scale not shown tied in with the motion of the setting means.

In Fig. II, the standards 12 of a surveying instrument or theodolite carry a sighting telescope 14 as is customary in this type of instrument. The instrument is also provided with a protractor scale or horizontal circle 16 which in this embodiment is preferably transparent and of glass. The standards 12 and protractor 16 are mounted on separate "centers" not shown but which permit the standards 12 bearing the sighting telescope 14 to be rotated with respect to the protractor scale so that the protractor scale 16 may be used to indicate the angular position of the sighting telescope in azimuth.

The telescope 14 is usually mounted for rotation about a horizontal axis. Another protractor or vertical circle (not shown) may be so mounted that it rotates with the telescope about the same axis. A reading device according to the teaching of the invention may be provided for reading either or both of the horizontal and vertical circles.

By way of illustration a reading system for the horizontal circle 16 is shown in Fig. II. A suitable system of light reflecting surfaces such as the mirrors 18 and 20 directs light to the space within the standards and onto the protractor scale 16 to illuminate a portion of the scale thereon. The illuminated portion of the scale is imaged onto another portion of the scale 180° therefrom by a suitable optical system which may be the reflectors 22 and 24 and lenses 26 and 28. The optical systems referred to may vary considerably in different embodiments of the invention depending on the structure of the system of "centers" not shown and other features of the design.

However, in the present invention the protractor scale 16 is provided with non radial divisions 17 as shown in Fig. III. The optical system shown in Fig. II when properly aligned will image the lines 17 from one portion of the scale 16 as shown in Fig. III onto the diametrically opposite portion so as to form X's. The scale 16 will normally be numbered with numbers 19 as shown in Fig. III. In order that the X formed will be associated with one number only, it is necessary that the reflector 22 in Fig. II be so arranged that the numbers from the first side of the scale 16 are cut out of the field of view so that the X formed on the diametrically opposite side of the scale 16 will be associated with one number only.

The X's may be formed by imaging lines together from diametrically opposite points of the same scale or the protractor 16 may be provided with two concentric divisions on the same or opposite sides. In the latter case, lines from one division will be imaged on diametrically opposite lines from the other division to form X's.

Fig. IV shows a protractor scale 106 having two concentric scales 107 and 108 on the same side of the glass wherein the lines in the two divisions are inclined oppositely to a radius. Such a scale will be useful where the optical system used for imaging one portion of the scale on the other is provided with an odd number of reflecting surfaces for Example 3 instead of the even number of reflecting surfaces 2 shown in Fig. II. For example, if one of the reflectors 22 or 24 is replaced by a penta prism, the X's will be formed in such a manner that the non radial lines will always intersect at their centers or at least at the same relative position along the length of the line.

In Fig. II the lenses 30 and 32 and the reflector 34 image the X's formed at the surface of the protractor scale 16 onto a reticle 36 through a plano-parallel tilting plate 38.

The eyepiece 40 is used for observing the scale lines combined as X's superimposed on the reticle 36 which is provided with a suitable index line such as 6 in Fig. I. The plano-parallel tilting plate 38 may be tilted, as by the knob 42 conveniently located outside of the standards 12 to displace the optical path from the protractor scale 16 to the reticle 36 and bring the nearest X of the scale into alignment with the index line of the reticle 36. The motion of the plano-parallel plate 38 is read from a suitably calibrated micrometer scale which is shown by way of illustration as a scale on the knob 42 to give the subdivision of the scale reading. The micrometer scale may be within the standards in which case it may be transparent and may be imaged at the reticle 36 so that it may also be seen through the eyepiece 40.

Other equivalent means may be used for aligning the index mark with the X which may displace either the X image or the index mark. For example the device known in the art as a filar micrometer may be used in which case the frame or reticle bearing the index mark would be moved by the action of a screw to bring the index mark into alignment with the nearest X. An angular scale would be provided to indicate the rotation of the screw.

The scale arrangement as seen through the eyepiece in a preferred embodiment of the invention is shown in Fig. V. In this embodiment, the reticle is provided with seven index lines 52 numbered from 0 to 60. The X 54 is formed from the lines imaged from diametrically opposite parts of the protractor scale associated with the number 192 representing degrees. The numbers associated with the index lines 52 represent minutes to the nearest ten minutes. The micrometer scale 56 at the top of the field is numbered to indicate minutes 58 and seconds 60.

The novel arrangement of using a plurality of index lines 52 is not limited to the exact arrangement of Fig. V. For example the divisions of the scale could be divided to 30 minutes instead of single degrees and four index lines could be provided numbered 0, 10, 20, 30 or any other suitable arrangement could be devised. Furthermore a plurality of index lines substantially arranged as shown could be used equally well in an optical reading system having a scale provided with radial lines imaged to form pairs of parallel lines. Such an arrangement is within the scope of the invention.

In an extension of the embodiment shown in Fig. V, the plurality of index lines could be used as a fixed micrometer breakdown scale. The reading would then be obtained by estimating the position of the X with respect to this scale. It would then become unnecessary to provide means for setting the X on an index line and the movable micrometer scale 56 could be eliminated. In this case the X averaging system has a definite advantage over the parallel line averaging system since it would be extremely difficult to estimate the position of the space between a pair of parallel lines with respect to a fixed scale.

The method of reading is also useful in surveying instruments or theodolites having scale reading systems of the non-averaging type. For example the protractor scale 16 in Fig. II could be provided with complete X's angularly spaced instead of with non-radial lines. The reflectors 22 and 24 and the lenses 26 and 28 would then be unnecessary but suitable means for illuminating the scale would have to be provided. Reading would be accomplished by setting the image of the nearest X into alignment with the index line by means of the plano-parallel plate 38 or equivalent means. In this manner it is possible to average the reading of one scale and not the other and use X's for both readings.

Having thus described the invention, what is claimed is:

1. In a theodolite having a sighting telescope mounted for rotation about an axis with respect to a fixed part of the instrument, a protractor member centered on said axis for indicating the position of said telescope, at least one scale on said protractor member made up of uniformly inclined non-radial straight lines, reflecting means directing light from a portion of said protractor scale to a diametrically opposite portion, means along the optical path formed by said reflecting means imaging diametrically opposite non-radial lines into the same focal plane, the number of reflecting surfaces in said reflecting means being chosen so that the non-radial lines will image as X's, a reticle having an index mark in the form of a straight line, means for imaging said X's onto said reticle in the plane of said index mark, means for bringing one of said X's into alignment with said index mark, scale means measuring the displacement necessary to bring said X into alignment with said index mark, and an eyepiece for viewing said X's superimposed on said index mark.

2. In a theodolite having a sighting telescope mounted for rotation about an axis with respect to a fixed part of the instrument, a protractor member centered on said axis for indicating the position of said telescope, at least one scale of angular divisions on said protractor member, reflecting means directing light from a portion of said protractor scale to a diametrically opposite portion, means along the optical path formed by said reflecting means imaging diametrically opposite divisions into the same focal plane, said diametrically opposite divisions being imaged adjacent to each other so that they may be read in pairs, a reticle having a series of index marks, means for imaging said angular divisions onto said reticle in the plane of said index marks, said index marks being spaced along the direction of measurement of said angular divisions as imaged on said reticle, a plano-parallel tilting plate for aligning one pair of angular divisions with one of said index marks, scale means measuring the displacement necessary to bring said pair of angular divisions into alignment with said index mark and an eyepiece for viewing said division lines superimposed on said index mark.

3. In a theodolite having a sighting telescope mounted for rotation about an axis with respect to a fixed part of the instrument, a protractor member centered on said axis for indicating the position of said telescope, at least one scale on said protractor member made up of uniformly inclined non-radial straight lines, reflecting means directing light from a portion of said protractor scale to a diametrically opposite portion, means along the optical path formed by said reflecting means imaging diametrically opposite non-radial lines into the same focal plane, the number of reflecting surface in said reflecting means being chosen so that the non-radial lines will image as X's, a reticle having a series of index marks, means for imaging said X's onto said reticle in the plane of said index marks, said index marks being straight lines spaced along the direction of measurement of said angular divisions as imaged on said reticle, means for bringing one of said X's into alignment with one of said index marks, scale means measuring the displacement necessary to bring said X into alignment with said index mark and an eyepiece for viewing said X's superimposed on said index marks.

ALLISTER L. BAKER.

REFERENCES CITED

The following references are of record in the file of this patent:

UNITED STATES PATENTS

| Number | Name | Date |
|---|---|---|
| 1,217,169 | Grauheding | Feb. 27, 1917 |
| 1,601,538 | O'Brien | Sept. 28, 1926 |
| 1,609,571 | Olson | Dec. 7, 1926 |
| 2,084,942 | Carpenter | June 22, 1937 |
| 2,406,828 | Grimshaw | Sept. 3, 1946 |
| 2,480,237 | Godfrey et al. | Aug. 30, 1949 |

FOREIGN PATENTS

| Number | Country | Date |
|---|---|---|
| 351,163 | Germany | Apr. 3, 1922 |
| 759,485 | France | Nov. 16, 1933 |
| 557,012 | Great Britain | Nov. 1, 1943 |
| 232,925 | Switzerland | Sept. 16, 1944 |